(12) United States Patent
Weinzierle et al.

(10) Patent No.: US 11,359,953 B2
(45) Date of Patent: Jun. 14, 2022

(54) IMPEDANCE SENSOR AND METHOD FOR ITS OPERATION

(71) Applicant: VEGA GRIESHABER KG, Wolfach (DE)

(72) Inventors: Christian Weinzierle, Wolfach (DE); Juergen Haas, Oberwolfach (DE)

(73) Assignee: VEGA Grieshaber KG, Wolfach (DE)

( * ) Notice: Subject to any disclaimer, the term of this patent is extended or adjusted under 35 U.S.C. 154(b) by 560 days.

(21) Appl. No.: 16/257,224

(22) Filed: Jan. 25, 2019

(65) Prior Publication Data
US 2019/0265093 A1    Aug. 29, 2019

(30) Foreign Application Priority Data
Feb. 26, 2018   (EP) ..................... 18155432

(51) Int. Cl.
| G01F 23/263 | (2022.01) |
| G01F 23/26  | (2022.01) |
| G01F 23/284 | (2006.01) |
| G01F 23/80  | (2022.01) |

(52) U.S. Cl.
CPC ............ *G01F 23/266* (2013.01); *G01F 23/26* (2013.01); *G01F 23/261* (2013.01); *G01F 23/284* (2013.01); *G01F 23/80* (2022.01); *G01F 23/804* (2022.01)

(58) Field of Classification Search
CPC ...... G01F 23/261; G01F 23/26; G01F 23/266; G01F 23/0061; G01F 23/0076
See application file for complete search history.

(56) References Cited

U.S. PATENT DOCUMENTS

| 4,164,146 A    | 8/1979  | DuVall et al. |
| 5,083,470 A *  | 1/1992  | Davis .................... G01F 23/263 |
|                |         | 73/864.24 |
| 9,356,606 B2 * | 5/2016  | Caffee ...................... H03B 1/00 |
| 2012/0290227 A1* | 11/2012 | Estrada ................. G01F 23/266 |
|                |         | 702/55 |
| 2017/0059386 A1 | 3/2017 | Munoz |

FOREIGN PATENT DOCUMENTS

| CN | 101014838 A    | 8/2007  |
| CN | 105322960 A    | 2/2016  |
| CN | 105866182 A    | 8/2016  |
| DE | 102013107120 A1 | 7/2013 |
| WO | WO 2013167384 A1 | 11/2013 |

OTHER PUBLICATIONS

Office Action for related European application 18155432.0, issued by European Patent Office dated Jul. 25, 2018.
Office Action for related Chinese application CN201910107397.7, issued by Chinese Patent Office dated Jul. 30, 2021.

* cited by examiner

*Primary Examiner* — Nathaniel J Kolb
(74) *Attorney, Agent, or Firm* — William Gray Mitchell (57) ABSTRACT

The invention is an impedance sensor with:
a probe which can be influenced in a capacity by a medium surrounding the probe,
a measuring oscillation circuit in which the probe is arranged as a capacity-determining element,
an electronics unit with a signal generator for excitation of the measuring oscillation circuit and a signal detector for determining a response signal of the measurement oscillation circuit and
a signal processing unit connected with the electronics unit, wherein the signal generator is designed as a digital controllable circuit.

6 Claims, 7 Drawing Sheets

IMPEDANCE SENSOR AND METHOD FOR ITS OPERATION

CROSS REFERENCE TO RELATED APPLICATIONS

This patent application claims priority to European Patent Application 18155432.0, filed on Feb. 6, 2018.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to an impedance sensor.

Background of the Invention

The present invention Impedance sensors of this type are known from the prior art, e.g. to measure limits or fill levels. Typical applications for detecting a predefined fill level (limit) include, for example, process containers, such as process tanks, storage tanks, silos, or pipelines in the processing industry. Impedance sensors are here often used as a so-called limit switch, i.e. to determine whether a filling medium exceeds or falls short of a specific fill level, the so-called limit, in different liquids, as well as granulated and powdered bulk materials.

Other types of limit switches are known as well, which are selected depending on the application field, process conditions, and properties of the filling medium. In addition to impedance sensors, here sensors are used that work according to the TDR (Time Domain Reflectometry) principle, or vibration limit sensors or capacitive sensors. For example, a switch command of the limit switch can start or stop filling equipment or draining equipment, in order to avoid the respective process container running over or running empty.

Figure 4:
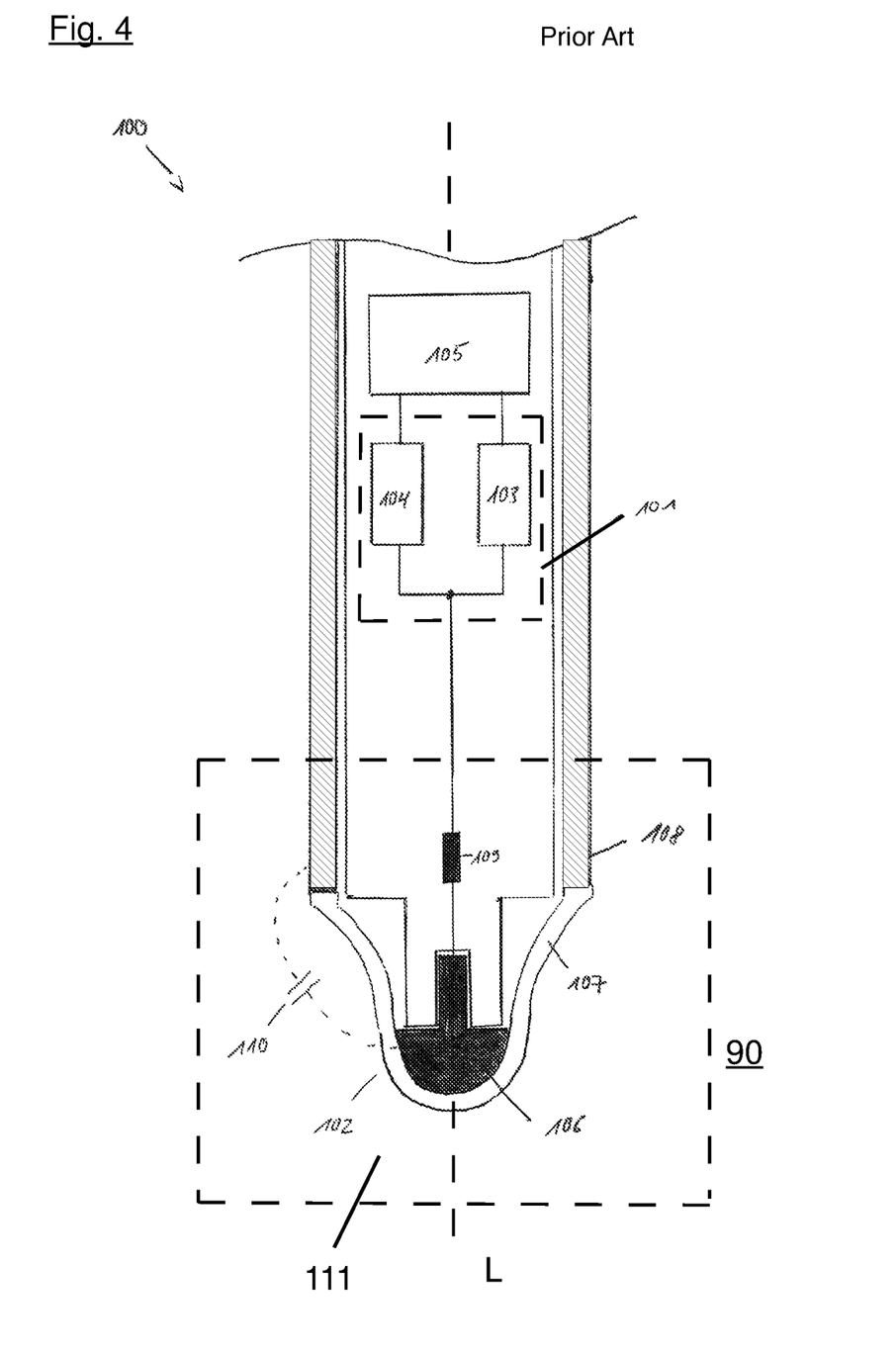
FIG. 4 is a line drawing evidencing an impedance sensor according to prior art (already discussed).

A known impedance sensor 100 is shown in FIG. 4.

FIG. 4 shows a simplified block diagram of an impedance sensor 100 according to the prior art. Essentially, the impedance sensor 100, hereinafter also referred to as limit sensor or limit detector, known from prior art comprises an electronics unit 101 and a probe 102. The probe 102 is designed in the present exemplary embodiment as a serial oscillation circuit. A measuring capacity 110 forms between a measuring electrode 106 and a reference electrode 108, which is connected to a discrete inductance 109 to the measuring oscillation circuit formed as a serial oscillation circuit.

The measuring electrode 106 is designed rotary-symmetrically to a longitudinal axis L of the impedance sensor 100 and separated from a process room 90 via isolation 107. Advantageously, discrete inductance 109 is selected such that a resonance frequency fres of the oscillation circuit is set for various media and/or covering conditions (empty, full and contaminated) between 100 MHz and 200 MHz.

An amount of a complex value-sensitive impedance |Z| of this measuring oscillation circuit varying due to frequencies is advantageously analyzed between 100 MHz and 200 MHz, i.e., the measuring oscillation circuit is stimulated by a frequency generator 103 with a frequency sweep showing frequencies between 100 MHz and 200 MHz, and a response signal (frequency response) of the measuring oscillation circuit is detected with a frequency detector 104. If a medium is in the proximity of the probe 102, the impedance behavior of the measuring oscillation circuit changes, i.e., in particular, its resonance frequency fres shifts, at which a minimum of the impedance forms.

A frequency sweep is understood as the sequential excitation with a plurality of consecutive frequencies within a frequency range, whereby the frequency range ideally contains all possible resonance frequencies of the measuring oscillation circuit.

The change in the impedance of the measuring oscillation circuit is used for an analysis in an evaluation and control unit 105. Specifically, the frequency response with regard to a frequency change $\Delta f$ and a change in the amplitude of a minimum of the impedance $\Delta Z$, also called an amplitude change, are evaluated and a switching command is generated therefrom.

The impedance sensors according to the prior art are used at process temperatures from −40° C. to +115° C. These temperature differences have a strong influence upon the behavior of the frequency generator 103 and the frequency detector 104, so that it can lead to measurement errors and thus to false switching commands. This is perceived as a disadvantage of the prior art.

Figure 5:
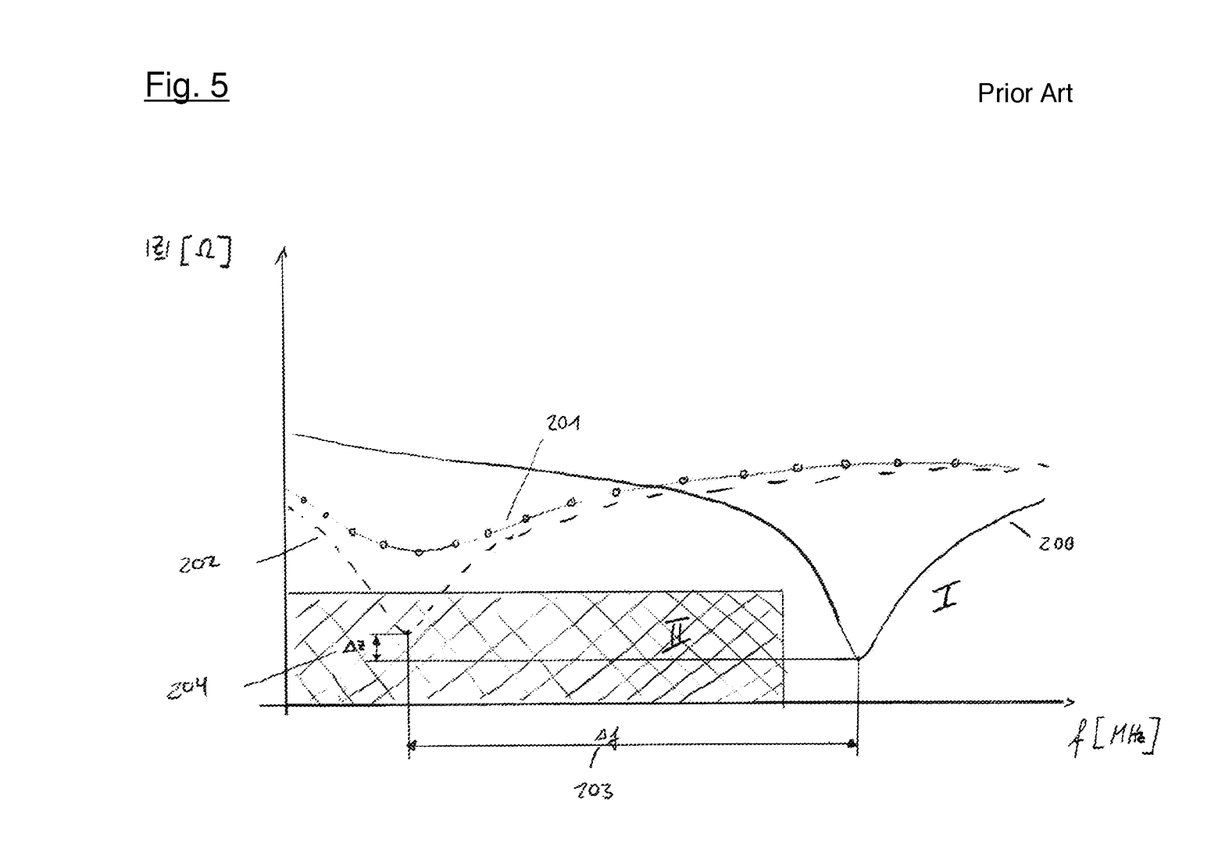
FIG. 5 is a graph evidencing response signals of the prior art sensor according to FIG. 4 with different coverage of the sensor (already discussed).

As an example, FIG. 5 lists the frequency responses of the impedance sensor 100 according to the state of the art for the medium ketchup.

The curve 200 shows the resonance behavior of a clean probe 102. The amount of impedance Z is shown in reference to the frequency f.

The behavior of a probe 102 contaminated with the adhesion of ketchup is shown in curve 201 and the probe 102 completely covered with ketchup is shown in curve 202.

Switching commands (empty, full) are realized by the evaluation and control unit 105, whereby according to the prior art only minimums of the resonance curves are used for the analysis. They are evaluated with regards to the frequency change $\Delta f$ and the amplitude change $\Delta Z$. If the minimum of the resonance curve is located in the range I, the evaluation and control unit 105 issues the switch command "empty". If, however, the minimum is in the range II, the "full" status is issued. The two defined switching ranges I, II can be programmed in the impedance sensor 100 by the factory or adjusted and changed by a customer alignment. Ideally, the areas should be defined in such a way that, for as many different media as possible, the standard settings are sufficient, since a customer-side alignment is time-consuming and is therefore undesired.

Due to the process temperatures ranging from −40° C. to +115° C., the electronics unit 101 of the impedance sensor 100 is also exposed to relatively high temperature fluctuations.

Figure 6:
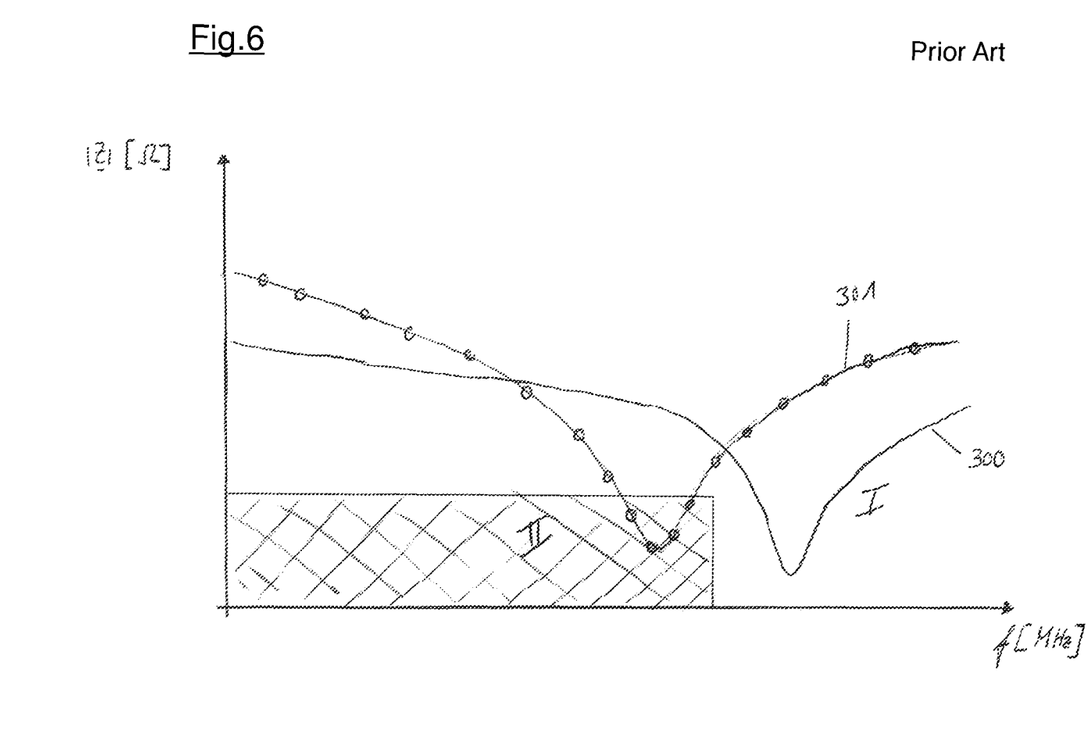
FIG. 6 is a graph evidencing response signals of the prior art sensor according to FIG. 4 at different temperatures (already discussed).

FIG. 6 shows two resonance curves of the impedance sensor 100 in an uncovered state of the probe 102, with the curve 300 describing the behavior at +25° C. and the curve 301 describing the behavior at +115° C. As can be seen from FIG. 6, the minimum of curve 300 is at 25° C. in range I and the minimum of curve 301 at 115° C. in range II, which, despite identical fill levels, that is uncovered sensors, corresponds to different switching states of the impedance sensor 100. The reason for this discrepancy is a temperature dependency of the electronics unit 101. Here, temperature influences can therefore lead to incorrect switching decisions of the limit sensor 100.

Figure 7A:
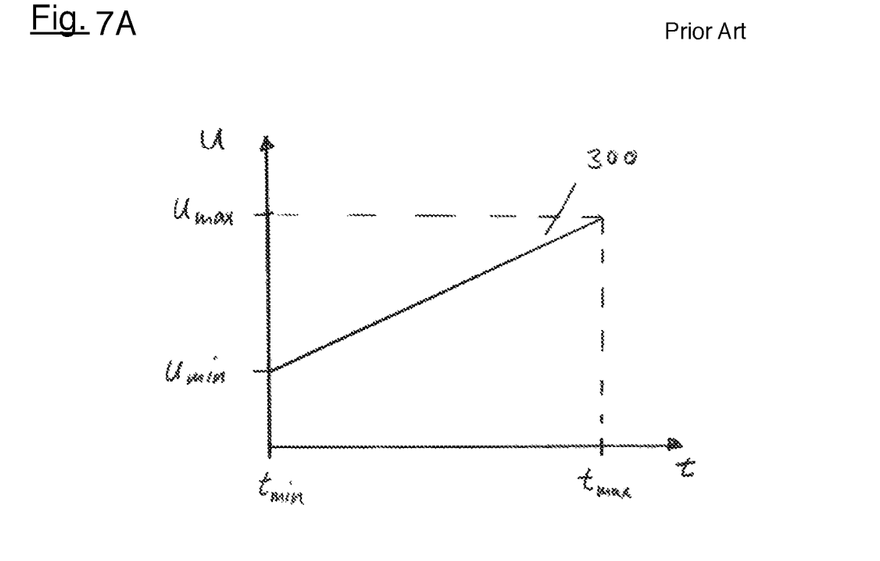
FIG. 7A is a graph evidencing an input signal for a signal generator according to the prior art (already discussed).
Figure 7B:
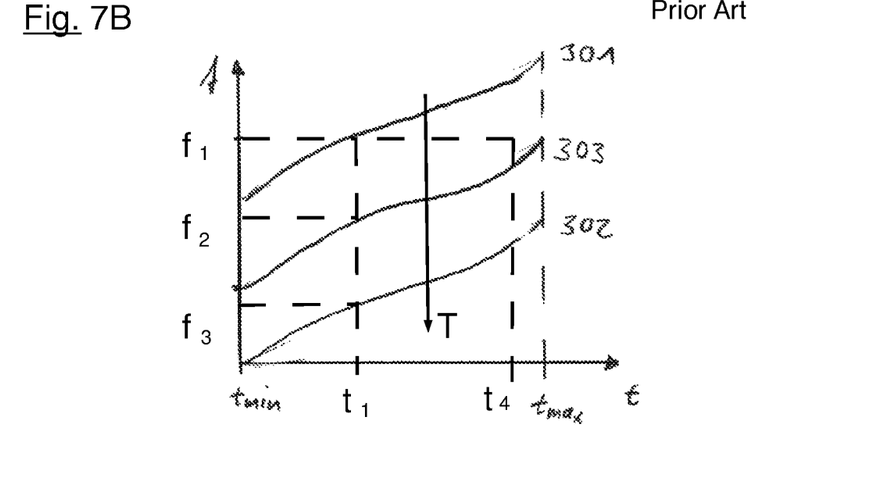
FIG. 7B is a graph evidencing output signals of a signal generator according to the prior art at different temperatures with an input signal according to FIG. 7A (already discussed).

A pronounced temperature behavior is displayed in particular by the signal generator 103. This is shown in FIGS. 7a and 7b. In the prior art, the signal generator 103 is designed as a voltage-controlled oscillator. The voltage-controlled oscillator is supplied with the analog voltage ramp 300, extending linearly between a minimum voltage Umin and a maximum voltage Umax shown in FIG. 7a, from a R-C element as the input signal. At the output, it should be possible to tap a linearly extending frequency ramp under ideal circumstances, with which each voltage value of the input signal 300 can be assigned a unique frequency f of the output signal. However, this is not the case due to temperature influences and a non-linear behavior of the voltage-controlled oscillator.

In FIG. 7b, the output characteristic curves of the voltage-controlled oscillator are shown at three different temperatures T, as they occur in a voltage ramp 300 as an input signal in accordance with FIG. 7a. For example, the output characteristic curve 301 describes the behavior at very low and the characteristic curve 302 at very high temperatures, i.e., in the present case at −40° C. and +100° C. At room temperature, the characteristic curve 303 is expected.

At a voltage value U1, which occurs at the voltage ramp 300 at the time t1, different frequencies f may occur depending on the temperature. For the temperatures shown in FIG. 7b, the frequencies f1, f2 and f3 are possible for one and the same input voltage. Conversely, the frequency f1 can be generated either by means of an excitation with the voltage U1 applied at the point of time t1 or a voltage U4 applied at the point of time t4.

As can be seen from FIG. 7b, it is no longer unambiguous due to the temperature dependency and the non-linearity of the signal generator 103, at which voltage U of the input signal a certain frequency f of the output signal is achieved and vice versa. This can lead to considerable measurement errors in practice, a problem solved by the present invention.

BRIEF SUMMARY OF THE INVENTION

In a preferred embodiment, an impedance sensor (400, 600) with
a probe (102) which can be influenced in a capacity by a medium surrounding the probe (102),
a measuring oscillation circuit in which the probe (102) is arranged as a capacity-determining element,
an electronics unit (406, 606) with a signal generator (402, 602) for excitation of the measuring oscillation circuit and a signal detector (104) for determining a response signal of the measurement oscillation circuit and
a signal processing unit (401, 601) connected with the electronics unit (406, 606) characterized in that the signal generator (402, 602) is designed as a digital controllable circuit.

In another preferred embodiment, the impedance sensor (400, 600) as described herein, characterized in that a control of the signal generator (402, 602) is carried out depending on the temperature.

In another preferred embodiment, the impedance sensor (400, 600) as described herein, characterized in a temperature sensor (403) which is preferably connected to the signal processing unit (401).

In another preferred embodiment, the impedance sensor (400, 600) as described herein, characterized in a memory in which temperature-dependent control curves are stored for the signal generator (402, 602).

In another preferred embodiment, the impedance sensor (400, 600) as described herein, characterized in that the control curves are designed such that the signal generator (402, 602) has a linear output signal.

In another preferred embodiment, the impedance sensor (400, 600) as described herein, characterized in a reference circuit (604), wherein the electronics unit (606) can alternating be connected to the measuring oscillation circuit or the reference circuit (604), and a memory in which a frequency response of the reference circuit (604) is saved.

In another preferred embodiment, the impedance sensor (400, 600) as described herein, characterized in that the signal generator (602) is designed as a circuit for direct digital synthesis or as a series circuit from a digital analog converter and a voltage-controlled oscillator.

In another preferred embodiment, a method for operating an impedance sensor (400, 600) with
a probe (102) which can be influenced in a capacity by a medium surrounding the probe (102),
a measuring oscillation circuit in which the probe (102) is arranged as a capacity-determining element,
an electronics unit (406, 606) with a signal generator (402, 602) for excitation of the measuring oscillation circuit and a signal detector (104) for determining a response signal of the measurement oscillation circuit and
a signal processing unit (401, 601) connected with the electronics unit (406, 606), wherein
the signal generator (402, 602) is designed as a digital controllable circuit with the following steps:
performing a temperature and/or reference measurement,
activating the signal generator (402, 602) with an input signal adapted to the result of the temperature and/or reference measurement,
determining a position of an amplitude minimum of a frequency response of the measurement oscillation circuit and
releasing a measuring result whether the probe is or is not covered with measuring medium.

In another preferred embodiment, the method as described herein, characterized in that, due to the temperature measurement, a saved sequence for the input signal is selected and fed to the signal generator (402, 602).

In another preferred embodiment, the method as described herein, characterized in that the progression of the input signal is adjusted in such a way that the output signal of the signal generator (402, 602) has a linear course.

In another preferred embodiment, the method as described herein, characterized in that, for the reference measurement, the signal generator (402, 602) is connected on the output side with a reference circuit (604), the frequency response of the reference circuit (604) is compared with a saved frequency response, the input signal of the signal generator (402, 602) is changed such that the frequency response of the reference circuit (604) corresponds to the saved frequency response, and use of the altered input signal as an adjusted input signal to stimulate the measuring oscillation circuit.

DETAILED DESCRIPTION OF THE INVENTION

The invention is an impedance sensor according to the invention comprises a probe that can be influenced in a capacity by a medium surrounding the measuring probe, a measuring oscillating circuit in which the measuring probe is arranged as a capacity-determining element, an electronics unit with a signal generator to excite the measuring oscillating circuit and a signal detector for determining a response signal of the measuring oscillating circuit, and a signal processing unit, which is connected to the electronics unit, with the signal generator being embodied as a digitally controlled circuit.

Due to an embodiment of the signal generator as a digital controllable circuit, it is possible in a simple way to supply the signal generator with adapted and almost arbitrarily designed input signals. It is thus possible to adjust the input signal of the signal generator in such a way that, for example, in spite of non-linearity and/or temperature dependencies of the signal generator, here a linearly extending frequency ramp is yielded at the output of the signal generator.

A signal generator according to the present application designed as a digital controllable circuit shall be understood as a circuit arrangement for generating the input signals for the measurement oscillation circuit, which is controlled with digital signals. In particular, a digital-analog conversion of the signals can take place. Here it is decisive that a digital control takes place, which then allows adapted voltage curves.

The signal generator configured as a digital controllable circuit can be designed for example as a serial circuit made from a digital analog converter and a voltage-controlled oscillator. A digital analog conversion can also occur already at the output of a controller though, which then activates the voltage-controlled oscillator.

Alternatively, the input signal can be adjusted such that additional temperature dependencies of the electronics unit and the probe can be compensated.

In a simple embodiment, a control of the signal generator can be carried out depending on the temperature, that is, here the signal generator is supplied with a predetermined or determinable input signal depending on the prevailing ambient temperature, through which a temperature dependency of the output signal of the signal generator is compensated. Compensation shall also be understood in this case such that the signal generator is supplied with a type of input signal that is adjusted such that an output signal is obtained that corresponds with an output signal that is obtained when the signal generator is not exposed to any temperature influences.

An adjustment of the input signal can occur particularly easily if the impedance sensor has a temperature sensor which is preferably connected to the signal processing unit. With the temperature sensor, a determination of the temperature applied to the signal generator or the electronics unit can be carried out in a simple and cost effective manner.

Ideally, the temperature sensor should be positioned near the signal generator. As a result, the ambient temperature of the signal generator can very precisely be determined and a more precise compensation can be achieved accordingly. The greater the distance between the signal generator and the temperature sensor, the greater the temperature difference between these two locations.

In practice, for example, the temperature sensor in the controller is used (for reasons of space and cost). This is located as close as possible near the components to be compensated.

In one embodiment of the present impedance sensor, it has a memory in which temperature-dependent control curves are saved for the signal generator. In the memory, for a plurality of different temperature values, the progression of the input signals of the signal generator are saved, respectively adjusted to the temperature determined, which are supplied thereto for an optimized measuring result.

Preferably, such curves for the input signal are stored for various temperature range of the measured temperature. Experiments have shown that a sufficiently accurate compensation occurs when the input signals are saved in 5° C. steps over the entire ranges of the operating temperature from −40° C. to +115° C.

The curves of the input signal are ideally designed in such a way that, in the case of a corresponding control curve of the voltage-controlled oscillator, the voltage-controlled oscillator has a linearly extending, particularly linearly increasing, output signal.

In addition or alternatively, a compensation of temperature dependencies of all components of the electronics unit can be carried out by means of a reference circuit, allowing the electronics unit to be connected alternating to the measuring oscillation circuit, thus in particular the signal generator and signal detector. Such compensation can be carried out for example, in that a memory is provided in which a response signal, in particular a frequency response, of the reference circuit is filed under defined normal conditions and upon excitation with an ideal frequency ramp. This memory can preferably be arranged in the signal processing unit. Thus, the frequency response of the reference circuit calculated under the given measurement conditions can be compared with the saved frequency response and the input signal of the frequency generator can be changed such that the frequency responses are consistent. Then the input signal that has been changed in this fashion can be fed to the measuring oscillation circuit and used for the measurement.

In a further development, the signal generator is designed as a circuit for direct digital synthesis. Direct digital synthesis is the designation of a method and integrated components in digital signal processing for the creation of periodic, band-limited signals with practically arbitrarily fine frequency resolution. The circuit for direct digital synthesis requires a control word from the evaluation and control unit as well as a reference cycle signal for the implementation of such signals. This can, for example, be realized from an external, temperature-stable quartz crystal and supplied to the circuit for direct digital synthesis. Using these two input variables, a very temperature-stable, analog output signal is generated.

A method according to the invention for operating an impedance sensor with a probe that can be influenced in a capacity by a medium surrounding the probe, a measuring oscillation circuit in which the probe (102) is arranged as a capacity-determining element, an electronics unit with a signal generator for exciting a measuring oscillation circuit and a signal detector for detecting a response signal of the measuring oscillation circuit, and a signal processing unit connected to the electronics unit, wherein the signal generator is designed as a digital controllable circuit, comprises the following steps:
 performing a temperature and/or reference measurement,
 activating the signal generator with an input signal adapted to the result of the temperature and/or reference measurement,
 determining a position of an amplitude minimum of a response signal of the measurement oscillation circuit, and
 releasing a measuring result whether the probe is or is not covered with measuring medium.

In one embodiment of the method, a saved process for the input signal can be selected and fed to the signal generator based on the temperature measurement. This procedure is particularly simple and can therefore be implemented without great effort.

Ideally, the curve of the input signal is adjusted in such a way that the output signal of the signal generator shows a linear course, i.e., in particular, a linear frequency ramp extending with a constant gradient is achieved.

In one embodiment of the method, for the reference measurement here the signal generator is connected at the outlet side to a reference circuit, the frequency response of the reference circuit is compared with a saved frequency response, the input signal of the signal generator is changed such that the frequency response of the reference circuit corresponds to the saved frequency response, and that the input signal adjusted in this fashion is used as the adjusted input signal to stimulate the measurement oscillation circuit.

DETAILED DESCRIPTION OF THE FIGURES

Figure 1:
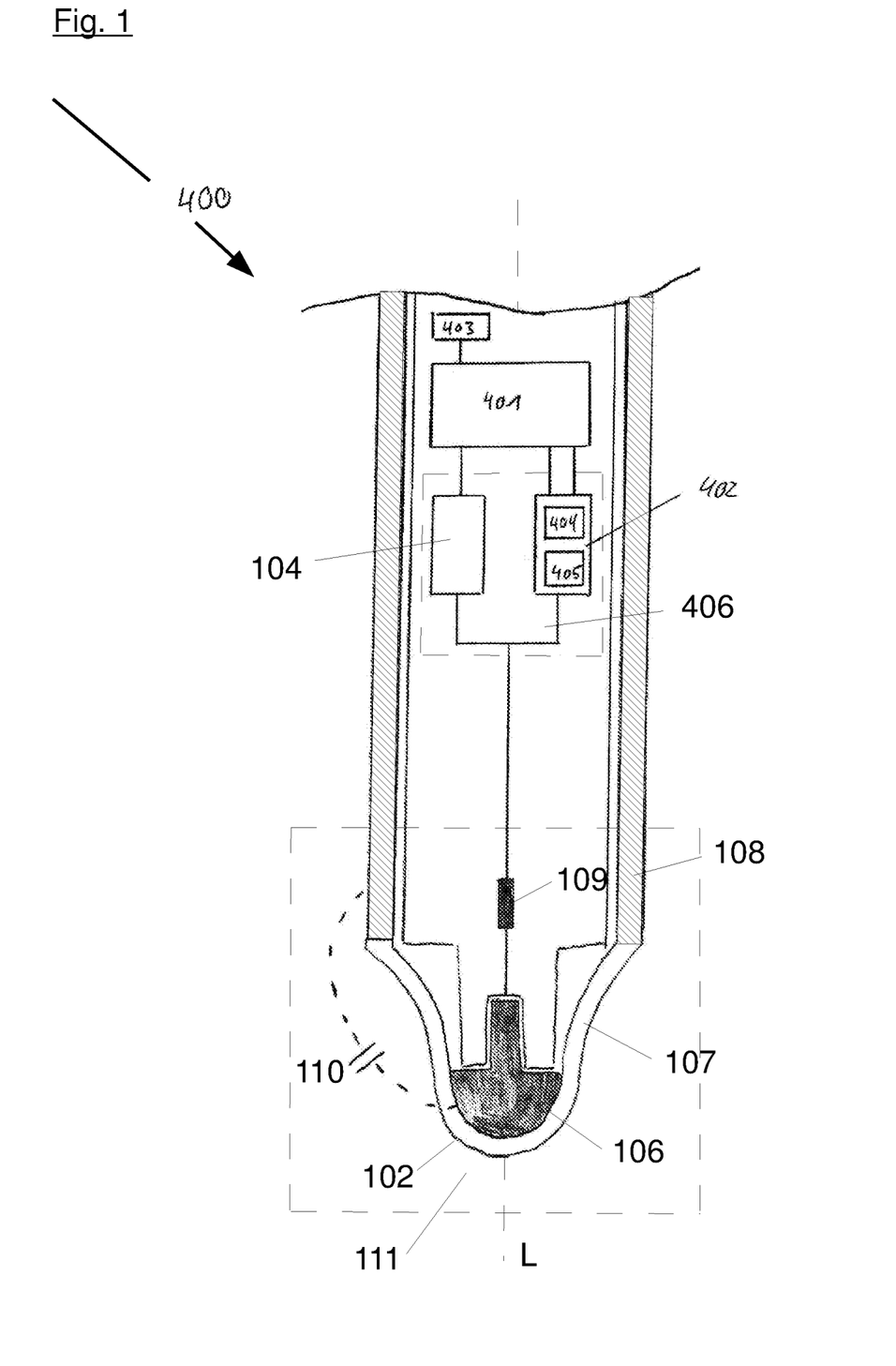
FIG. 1 is a line drawing evidencing first exemplary embodiment of a digital controllable impedance sensor.

FIG. 1 shows a FIG. 1 shows a first exemplary embodiment of an impedance limit switch 400 according to the present application.

Essentially, the impedance limit switch 400 according to FIG. 1 consists of an evaluation and control unit 401, a digitally controlled signal generator 402 connected with the evaluation and control unit 401, as well as a temperature sensor 403 also connected with the evaluation and control unit 401.

In this exemplary embodiment, the signal generator 402 consists of a digital analog converter 404 and a voltage-controlled oscillator 405, which is arranged downstream in reference to the A-D converter 404. A digital activation and timed pulsing of the signal generator 402 is assumed here by the evaluation and control unit 401. This feeds a digital control signal to the digital analog converter 404, which signal is converted thereby into an analog voltage signal to control the voltage-controlled oscillator 405. The voltage-controlled oscillator 405 in turn converts the analog voltage signal into a frequency signal, which is supplied to a measuring oscillation circuit consisting of a probe 102 and a discrete inductance 109. The measuring oscillation circuit is essentially constructed and has the same functionality as those known from the prior art. Reference is made here to the description in connection with FIG. 4.

Digital control signals for the signal generator are stored in a memory that is arranged in the present exemplary embodiment in the evaluation and control unit 401. These control signals include temperature-dependent correction parameters as well as linearization values for compensation of a temperature cycle of the voltage-controlled oscillator 405, which are defined by the factory and programmed in the memory.

By measuring the current temperature at the location of the impedance sensor 400, the appropriately stored digital control signals can be taken from the memory and fed to the signal generator 402. Through this procedure, a temperature-stable, linearized frequency ramp is realized at the output of the signal generator 402 and thus enables reliable and secure limit measurement. A so-prepared impedance sensor or limit sensor 400 is usable and reliable across the entire permissible temperature range with consistent measurement accuracy.

Alternatively, the digital controllable signal generator 402 can be formed by a circuit for direct digital synthesis (DDS). In this example, the digital control is realized by means of a control word from the evaluation and control unit 401. The control word contains information about the analog output signal to be generated. The clocking of the DDS is realized by an external temperature-stable quartz crystal. Using these two input variables of the DDS, the output frequencies are generated. The impedance limit switch 400 likewise comprises a memory and a temperature sensor 503, so as described in FIG. 1, a temperature-controlled activation of the signal generator 402 can take place. In contrast to the embodiment according to FIG. 1, DDS has the advantage that it works very temperature-stable and accordingly reduces the temperature dependency of the signal generator.

In an alternative embodiment, the digital controllable signal generator 402 can also be designed as a phase control loop. The remaining circuit can stay unchanged.

Figure 2:
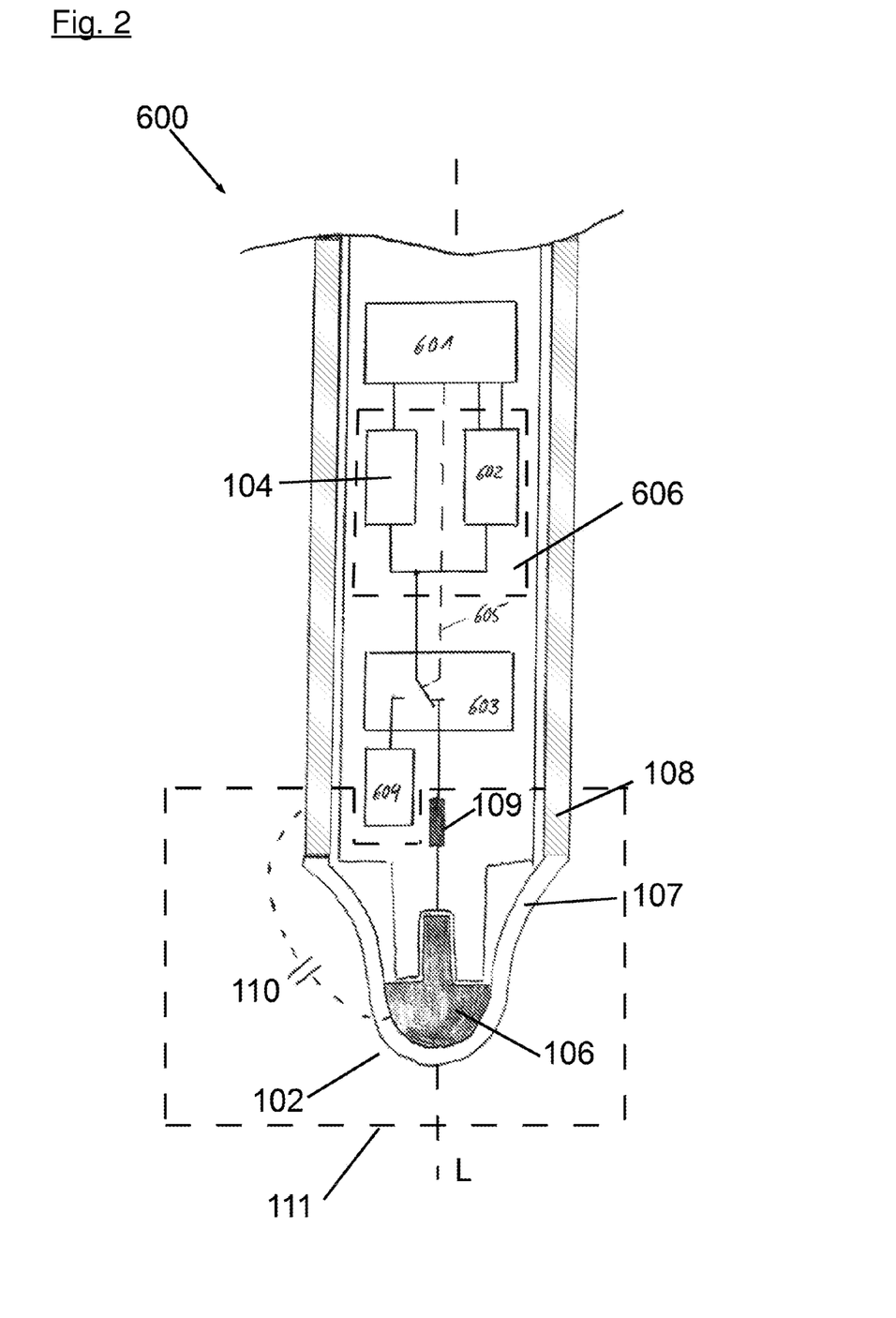
FIG. 2 is a line drawing evidencing a second exemplary embodiment of a digital controllable impedance sensor.

FIG. 2 shows another exemplary embodiment of an impedance limit switch 600 according to the present application.

The impedance limit switch 600 comprises an evaluation and control unit 601, a digital controllable signal generator 602, a switch 603, and a reference circuit 604. The evaluation and control unit 601 comprises a memory, in which the impedance behavior of the reference circuit 604 is saved by the factory, in particular a response signal of the reference circuit 604 upon excitation with a predetermined signal, particularly a predetermined frequency ramp, and/or a frequency sweep.

With the help of the switch 603, which can be realized as an HF switch, for example, the control line 605 and the evaluation and control unit 601 can alternately connect the electronics unit 606 with the reference circuit 604 or the measuring oscillation circuit, i.e. the reference circuit 604 can be activated and accordingly deactivated by the measuring circuit. After activation of the reference circuit 604, its frequency response or the impedance behavior is measured and compared with the saved reference curve. Via the evaluation and control unit 601, the digital control signal for the signal generator 602 is changed and/or varied until the measured frequency response and the saved reference curve are consistent, or within the framework of a specified maximum deviation. Then the reference circuit 604 is deactivated again and the measuring oscillation circuit is activated. The signal generator 602 is now fed with the correspondingly modified digital control signal, so that the signal generation unit 602 is fed with a signal that compensates both the temperature progression of the entire electronics unit 606 as well as any non-linearities of the signal generator 602 and the signal detector.

This example can be used in particular for the temperature compensation of the entire electronics unit 606. A corresponding adaptation of the digital control signal can take place several times per minute/second or before each measurement.

In the prior art, the measurement oscillation circuit of the impedance sensors is excited over their entire operating range 703, i.e. in the range from a lower limit frequency fmin up to an upper limit frequency fmax. For this, the signal generator is charged with an analog voltage ramp which is continuously subjected to a sequence from a minimum voltage to a maximum voltage. This is only possible as the voltage ramp is generated analog by means of an R-C element and thus the provision of individual discrete voltage values is not possible.

Figure 3:
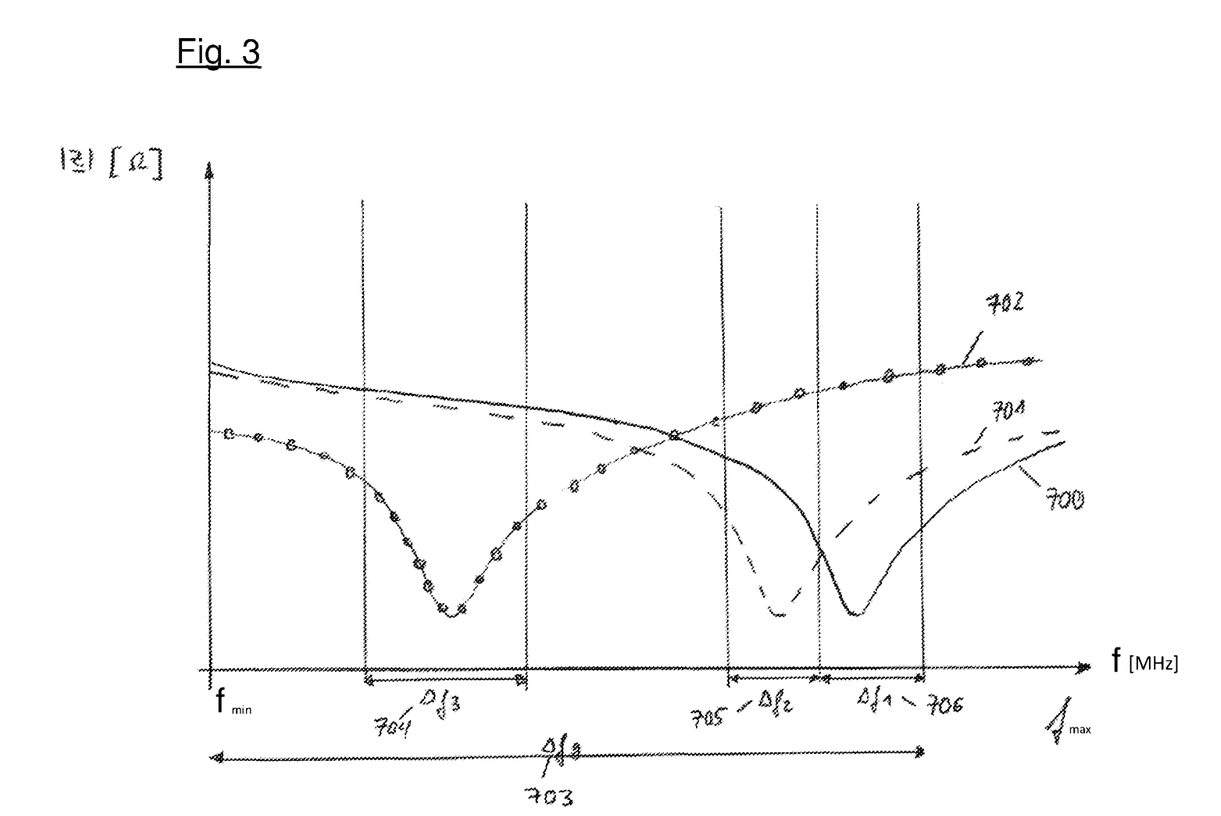
FIG. 3 is a line drawing evidencing an exemplary embodiment of an impedance sensor according to FIG. 1 or 2.

FIG. 3 shows an exemplary embodiment of an impedance sensor according to the present application, which is enabled by a digital activation of the signal generator.

With a digital controllable signal generator according to the present application, it is now possible to stimulate the signal generator with digital signals on discrete voltage values and thus only to run through or analyze certain, smaller ranges of a large frequency range 703. This can significantly reduce a measurement time and thus an energy requirement of the impedance limit switch.

FIG. 3 shows examples of three different frequency responses of a probe 102. A clean and thus uncovered probe 102 causes the resonance behavior 700. The resonance behavior of a probe 102 covered with oil is shown in curve 701. Curve 702 describes the resonance behavior of a probe 102, which is completely surrounded by water.

If the impedance limit switch knows the detection medium, then it is not required to examine the entire frequency range 703, but it is sufficient to analyze only the frequency ranges in which the resonance frequency is expected.

For aqueous solutions, it is therefore sufficient as an example to examine a range 704 and for oil-based media a range 705. The signal generator therefore only needs to deliver a frequency signal for this range. If the minimum of the resonance curve is located in the respective range 704 or 705, the limit switch releases the covered state. If no minimum is present in the relevant area, then the range 706 is analyzed. If the minimum of the resonance curve is located in this range, the status uncovered is released. The impedance limit switch can be set by customer parametrization or by the factory to match the medium to be measured.

LIST OF COMPONENTS

90 Process room
100 Impedance sensor
101 Electronics unit
102 Probe
103 Frequency generator
104 Signal detector
105 Control unit
106 Measuring electrode
107 Insulation
108 Reference electrode
109 Inductance
200 Curve
201 Curve
202 Curve
300 Curve
301 Curve
400 Impedance sensor
401 Evaluation and control unit
403 Temperature sensor
404 Digital analog converter
405 Oscillator
600 Impedance limit switch
601 Evaluation and control unit
602 Signal generator
603 Switch
604 Reference circuit
700 Curve
701 Curve
702 Curve
703 Frequency range
704 Range
705 Range
706 Range
f Frequency
Δf Frequency change
t Time
U Voltage
ΔZ Amplitude change
Z Impedance
$U_{min}$ Minimum voltage
$U_{max}$ Maximum voltage
$f_{min}$ Limit frequency
$f_{max}$ Limit frequency
$f_1$ First frequency
$f_2$ Second frequency
$f_3$ Third frequency
$t_1$ First time
$t_2$ Second time
$t_3$ Third time
$t_4$ Fourth time
91 Clamping bolt
92 Clamping nut
98 Sensor housing
100 Vibration sensor
A Axial direction
D Diameter
$M_1$ First torque
$M_2$ Second torque

We claim:

1. An impedance sensor with
   a probe which can be influenced in a capacity by a medium surrounding the probe,
   a measuring oscillation circuit in which the probe is arranged as a capacity-determining element,
   an electronics unit with a signal generator for excitation of the measuring oscillation circuit and a signal detector for determining a response signal of the measuring oscillation circuit, wherein the signal generator is designed as a digital controllable circuit, comprising a voltage-controlled oscillator, and wherein the signal generator is controlled via control curves, the control curves for the signal generator being designed such that the signal generator has a linearly extending frequency ramp as output signal a signal processing unit connected with the electronics unit, and at least one of a temperature sensor which is connected to the signal processing unit, wherein a control of the signal generator is carried out based on a temperature measurement of the temperature sensor, or a reference circuit, wherein the electronics unit can alternately be connected to the measuring oscillation circuit or the reference circuit, and a memory in which a frequency response of the reference circuit is saved and a control of the signal generator is carried out based on the frequency response.

2. The impedance sensor according to claim 1, further comprising a memory in which temperature-dependent control curves are stored for the signal generator.

3. The impedance sensor according to claim 1, wherein the signal generator is designed as a circuit for direct digital synthesis or as a series circuit from a digital-to-analog converter and a voltage-controlled oscillator.

4. A method for operating an impedance sensor of claim 1, comprising the following steps:

performing a temperature measurement with the temperature sensor, activating the signal generator with an input signal adapted to the result of the temperature measurement, wherein, due to the temperature measurement, a control curve for the input signal is selected and fed to the signal generator, wherein a curve of the input signal is adapted in such a way that the output signal of the signal generator is a linearly extending frequency ramp, determining a position of an amplitude minimum of a frequency response of the measuring oscillation circuit and releasing a measuring result whether the probe is or is not covered with measuring medium.

5. A method for operating an impedance sensor of claim 1, comprising the following steps:

performing a reference measurement with the reference circuit, activating the signal generator with an input signal adapted to the result of the reference measurement, wherein, due to the reference measurement, a control curve for the input signal is selected and fed to the signal generator, wherein a curve of the input signal is adapted in such a way that the output signal of the signal generator is a linearly extending frequency ramp, determining a position of an amplitude minimum of a frequency response of the measuring oscillation circuit and releasing a measuring result whether the probe is or is not covered with measuring medium.

6. The method according to claim 5, wherein, for the reference measurement, the signal generator is connected on the output side with a reference circuit, the frequency response of the reference circuit is compared with a saved frequency response, the input signal of the signal generator is changed such that the frequency response of the reference circuit corresponds to the saved frequency response, and use of the altered input signal as an adjusted input signal to stimulate the measuring oscillation circuit.

* * * * *